Feb. 5, 1924.  
W. H. J. DOWNEY  
1,482,977  
ANTIGLARE HEADLIGHT FOR AUTOMOBILES  
Filed March 27, 1923  
2 Sheets-Sheet 1
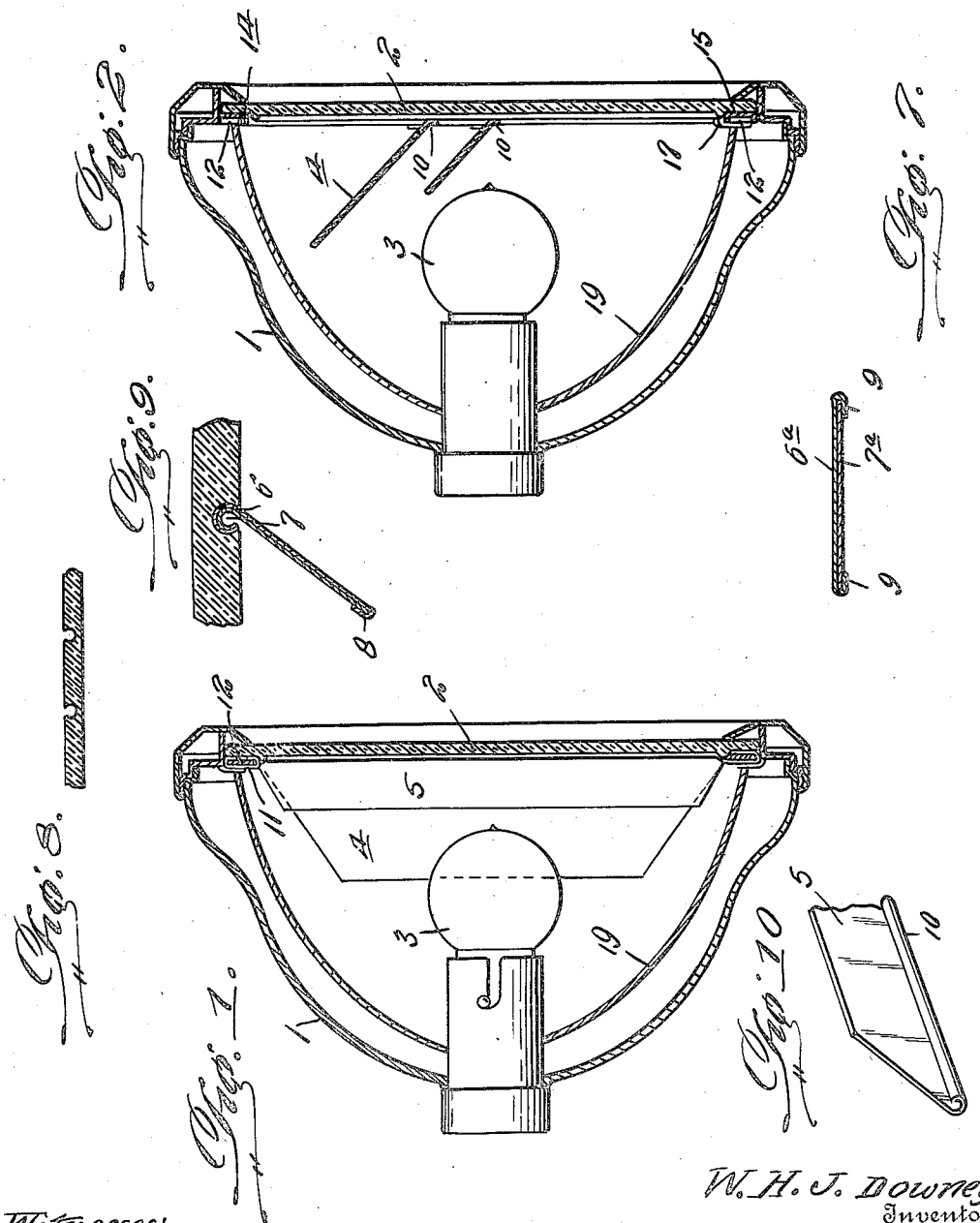

Feb. 5, 1924. 1,482,977
W. H. J. DOWNEY
ANTIGLARE HEADLIGHT FOR AUTOMOBILES
Filed March 27, 1923  2 Sheets-Sheet 2
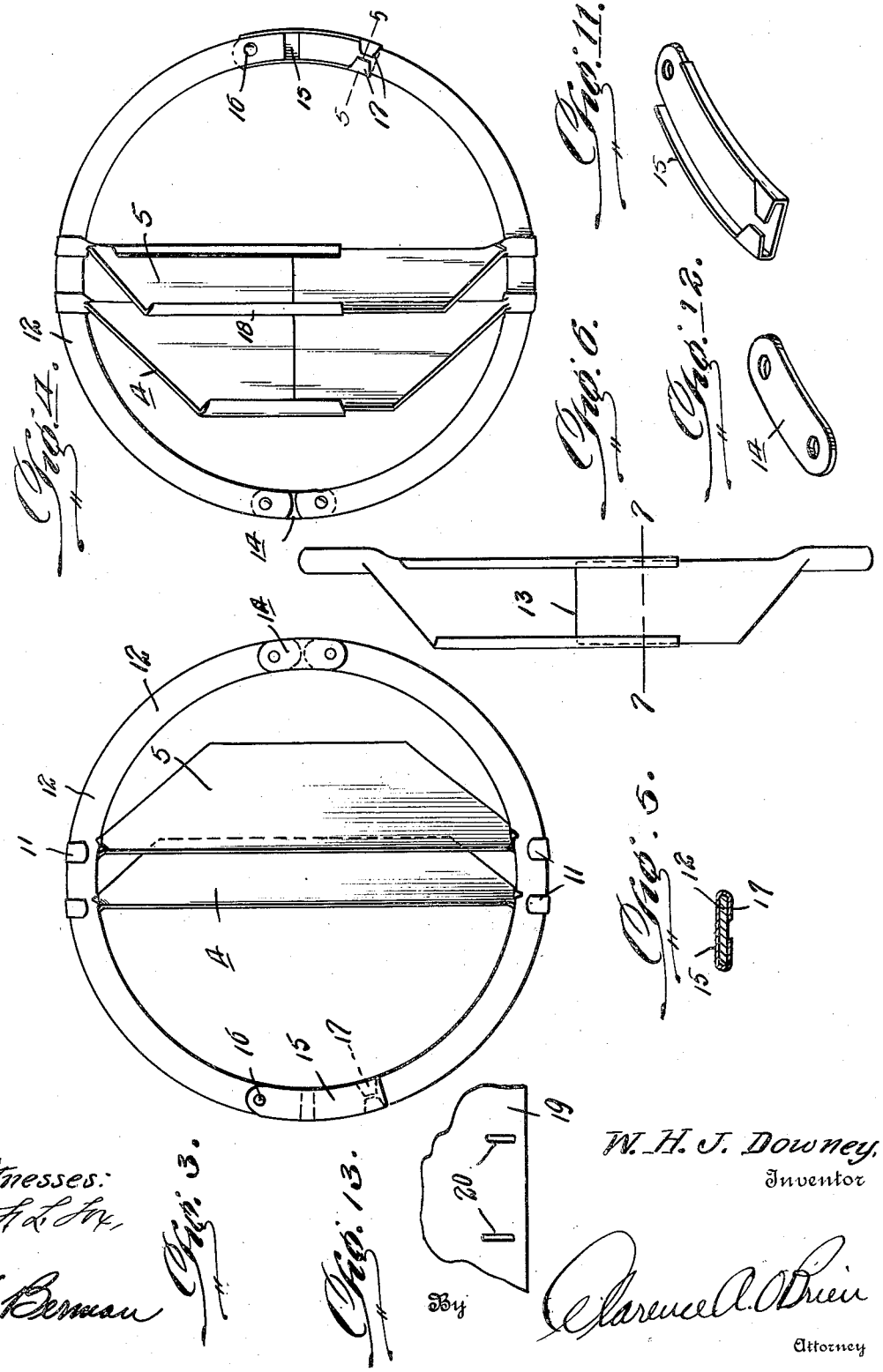
Witnesses:
W. H. J. Downey,
Inventor
By
Clarence A. O'Brien
Attorney Patented Feb. 5, 1924.

1,482,977

UNITED STATES PATENT OFFICE.

WILLIAM H. J. DOWNEY, OF WILMINGTON, DELAWARE.

ANTIGLARE HEADLIGHT FOR AUTOMOBILES.

Application filed March 27, 1923. Serial No. 627,973.

*To all whom it may concern:*

Be it known that WILLIAM H. J. DOWNEY, a citizen of the United States, residing at Wilmington, in the county of New Castle and State of Delaware, has invented certain new and useful Improvements in Antiglare Headlights for Automobiles, of which the following is a specification.

This invention has reference to anti-glare headlights for automobiles and its object is to provide means whereby the direct course of light from the light source to the eyes of the observer is deflected so that glares are prevented and obtrusive effects upon the eyes of the observer are avoided without such effects being hurtful or harmful to the eyes of an observer and accidents due to glares are avoided.

In accordance with the invention the customary headlight outfit is employed and the customary light unit is used as well as the usual light projecting reflector but in interposed relation to the light unit and reflector there are installed light obstructing devices so situated as to interpose between the light giving unit and the eyes of the observer in such a manner as to prevent any glare from reaching the eyes of the observer and so avoiding the production of blinding glares.

Provision is made for the adjustment of the light obstructing device or baffles between the eyes of the observer and the source of light, the means for adjusting these baffles in such manner that obtrusive glares are entirely avoided.

The invention will be best understood from a following detailed description taken in connection with the accompanying drawings forming part of this specification with the understanding that the invention is not confined to any strict conformity with the showing of the drawings but may be changed and modified so long as such changes and modifications mark no material departure from the salient features of the invention as expressed in the appended claims.

In the drawings:

Figure 1 is a front to rear section through a headlight equipped with the invention;

Figure 2 is a front to rear section at right angles to the section of Figure 1;

Figure 3 is a view of the structure shown in Figure 1 with the casing of the headlight omitted;

Figure 4 is a view of the opposite face of Figure 3, with some parts of the modified construction;

Figure 5 is a section on line 5—5 of Figure 4;

Figure 6 is a modified form of one of the glare preventing devices employed in the structure;

Figure 7 is a section on the line 7—7 of Figure 6;

Figure 8 is a detail cross section;

Figure 9 is a cross section showing another manner of mounting of the light shields illustrated in Figure 2;

Figure 10 is a detail perspective view showing a modified form of the light obstructing structure;

Figure 11 is a perspective view of a coupling shown in the structure illustrated in Figure 4;

Figure 12 is a perspective view of a ring coupling; and

Figure 13 is a detail view of a modification of the structure.

Referring to the drawings, and more particularly to Figures 1, 2 and 3, there is shown a headlight shell 1 which may be taken as of ordinary headlight construction and is formed of sheet metal of appropriate contour and this headlight is indicated as provided with a front lens 2 and a light unit 3.

The headlight casing need not differ from the ordinary headlight practice and the light giving unit 3 which is in conformity with the light giving unit of the type to be energized by electric currents.

In order to prevent obtrusive glares there are installed on the rear face of the lens 2 anti-glare shields 4 and 5, respectively. These shields are customarily made of flat metal of appropriate width so that each shield will overlie an appropriate portion of an adjacent shield so that together the two shields will completely hide from the eyes of an observer the image of the light giving unit.

As shown in Figures 8 and 9, the lens 2 of the headlight may be formed with a pair of spaced grooves adapted to receive a bead 6 formed on the lower edges of the shields which in position will have a sufficient binding action in the groove to prevent a pivotal movement of the shields after being set in the lens, which structure is adapted for use in place of the ring member and the seals having the terminal tongues 11 such as shown in Figures 3 and 4.

In order to stiffen the shield the edge remote from the bead 6 is returned on itself as indicated at 8.

In order to adapt the shield to different sizes of lenses they may be formed of two slidable members $6^a$ and $7^a$ as indicated in Figure 7 so as to slide lengthwise upon each other with terminal portions 9 overlapping to permit a sliding of the shields one on the other, and all these shields may be non-adjustable with reference to each other but provided with edged tongues 10 adapted to be seated in the grooves 7.

The shields 4 and 5 are each made of one sheet of sheet metal with terminal tongues 11, and in the structures as shown in Figures 1, 2 and 3, the tongues are twisted in the direction of their longitudinal axes and returned and supporting the ring 12 which may be made of fibrous material or other suitable material are bent upon themselves to clamp the shields through the ring 12, or as shown in Figure 6 the shields may be each made of two pieces joined by a slip connection 13 as in Figure 6 to permit longitudinal adjustment of the shields to accommodate them to different sizes of structure.

In the showing of Figures 3 and 4 the ring 12 is formed with a hinged joint 14 riveted to the body of the ring and at a point diametrically opposite from the hinge 14, the adjacent ends of the ring are connected by a band 15 having a rivet junction 16 at one side and a slip junction 17 at the other side of the joined ends of the ring. The shields in the structure shown in Figure 4 have lips 18 embracing the edges of the companion joints of the slip joints as shown in Figure 4 and indicated in Figure 5.

In Figure 13 there is shown a still further modified form of the structure in which is indicated a part 19 of one of the reflectors with spaced slots 20 in which the tongues 11 may be extended and bent to hold the shields in place.

What is claimed is:

1. An automobile headlight structure provided with a reflector, a lens for location in front of the reflector, a supporting ring for the lens with said ring having its continuity interrupted, and a pair of transverse shields associated for joint action and provided with terminal portions for embracing the ring and extensible to be adapted for attachment to reflectors of different sizes.

2. An automobile headlight structure provided with a reflector, a lens for location in front of the reflector, a supporting ring for the lens with said ring having its continuity interrupted, and a pair of transverse shields associated for joint action and provided with terminal portions for embracing the ring and extensible to be adapted for attachment to the reflectors of different sizes, said ring having means for joining its ends to adapt a ring to the shields to different sizes of headlights.

In testimony whereof I affix my signature.

WILLIAM H. J. DOWNEY.